(12) United States Patent
Quigley et al.

(10) Patent No.: US 7,543,871 B2
(45) Date of Patent: Jun. 9, 2009

(54) CENTER CONSOLE

(75) Inventors: Douglas J. Quigley, Rochester, MI (US); Robert Smyczynski, Metamora, MI (US); Michael A. Kornilov, Bruce, MI (US); Todd McKinzie, Goodrich, MI (US); Irina Zavatski, Rochester Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/615,267

(22) Filed: Dec. 22, 2006

(65) Prior Publication Data

US 2008/0150307 A1 Jun. 26, 2008

(51) Int. Cl.
*B60R 7/06* (2006.01)
*B62D 25/14* (2006.01)

(52) U.S. Cl. .............. 296/24.34; 296/70; 296/37.12

(58) Field of Classification Search .............. 296/24.34, 296/37.8, 37.12, 37.14, 70, 74, 37.1, 72; 180/90; 224/483
See application file for complete search history.

(56) References Cited

U.S. PATENT DOCUMENTS

| | | | |
|---|---|---|---|
| 3,946,826 A | | 3/1976 | Guhl et al. |
| 5,102,181 A * | | 4/1992 | Pinkney .................... 296/37.12 |
| 5,511,842 A * | | 4/1996 | Dillon ...................... 296/24.42 |
| 6,123,377 A * | | 9/2000 | Lecher et al. ............. 296/24.34 |
| 6,158,795 A * | | 12/2000 | Gray et al. ................. 296/37.8 |
| 6,176,534 B1 * | | 1/2001 | Duncan ................... 296/37.12 |
| 6,203,088 B1 * | | 3/2001 | Fernandez et al. ......... 296/37.8 |
| 6,241,300 B1 * | | 6/2001 | Suzuki ...................... 296/37.8 |
| 6,394,526 B1 * | 5/2002 | Gyllenspetz ................. 296/70 |
| 6,428,072 B1 * | 8/2002 | Moore ...................... 296/24.34 |
| 6,634,692 B1 * | 10/2003 | Barat et al. .................... 296/70 |
| 6,659,405 B1 * | 12/2003 | Takagi et al. ............... 248/27.1 |
| 6,666,492 B1 * | 12/2003 | Schmidt et al. ............... 296/70 |
| 6,709,041 B1 * | 3/2004 | Hotary et al. ................. 296/70 |
| 6,719,343 B2 * | 4/2004 | Emerling et al. ......... 296/24.34 |
| 6,726,267 B2 * | 4/2004 | Kim et al. ................. 296/24.34 |
| 6,746,065 B1 * | 6/2004 | Chan ....................... 296/24.34 |
| 6,752,444 B2 * | 6/2004 | Kitano et al. ............ 296/184.1 |
| 6,890,012 B2 * | 5/2005 | Maierholzner ........... 296/24.34 |
| 6,921,118 B2 * | 7/2005 | Clark et al. .............. 296/24.34 |
| 6,945,582 B2 * | 9/2005 | Chen ......................... 296/37.8 |
| 7,044,529 B2 * | 5/2006 | Svenson et al. ............ 296/37.8 |
| 7,090,186 B2 * | 8/2006 | Quinno et al. .............. 248/324 |
| 7,097,082 B2 * | 8/2006 | Wallaker ..................... 224/483 |
| 7,111,883 B1 * | 9/2006 | Patel et al. ............... 296/24.34 |
| 7,114,755 B1 * | 10/2006 | Sturt et al. ............... 296/24.34 |
| 7,168,749 B2 * | 1/2007 | Schmidt et al. .......... 296/24.34 |
| 7,186,118 B2 * | 3/2007 | Hansen et al. ................ 439/34 |
| 7,192,070 B2 * | 3/2007 | Radu et al. .............. 296/24.34 |
| 7,192,072 B2 * | 3/2007 | Schmidt et al. .......... 296/37.12 |
| 7,201,416 B2 * | 4/2007 | Rist ......................... 296/24.34 |
| 7,261,355 B2 * | 8/2007 | Stack et al. .............. 296/37.12 |
| 7,337,566 B2 * | 3/2008 | Inayoshi ...................... 40/593 |
| 2002/0101091 A1 * | 8/2002 | Ito ............................ 296/37.12 |
| 2006/0197353 A1 * | 9/2006 | Hanzel et al. ............ 296/37.12 |
| 2007/0152461 A1 * | 7/2007 | Joler et al. ............... 296/24.34 |
| 2007/0176448 A1 * | 8/2007 | Spykerman et al. ...... 296/24.34 |

* cited by examiner

*Primary Examiner*—Glenn Dayoan
*Assistant Examiner*—Gregory Blankenship
(74) *Attorney, Agent, or Firm*—Ralph E. Smith

(57) ABSTRACT

A center console for a instrument panel includes a housing having a display region and an actuation mechanism associated with the housing. The actuation mechanism permits movement of the housing relative to the instrument panel.

16 Claims, 5 Drawing Sheets

CENTER CONSOLE

FIELD OF THE INVENTION

The present invention relates to center consoles and more particularly to a movable center console.

BACKGROUND OF THE INVENTION

Instrument panels are widely used in conventional vehicles to house various subsystems of the vehicle. For example, the instrument panel may include a series of controls for use by vehicle occupants in controlling subsystems of the vehicle such as a radio or a heating, ventilation and air conditioning system (i.e. HVAC system). The instrument panel may be configured such that the controls are located on a center console and are positioned at an angle relative to a driver seat to facilitate use of the controls by the driver.

While positioning controls relative to a driver seat may improve use of the controls by a driver, use of the controls by a passenger seated in a passenger seat adjacent to the driver seat is hindered due to the controls being positioned at an angle relative to the instrument panel.

SUMMARY OF THE INVENTION

A center console for an instrument panel includes a housing having a display region and an actuating mechanism associated with the housing. The actuation mechanism permits movement of the housing relative to the instrument panel.

An instrument panel includes a center console having a display and at least one of an audio system and a HVAC system attached thereto. The center console is selectively pivotable relative to the instrument panel about a first axis and selectively translatable relative to the instrument panel.

A vehicle includes an instrument panel and a center console having a display and at least one of an audio system and a HVAC system mounted thereto. The center console is selectively moveable relative to the instrument panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
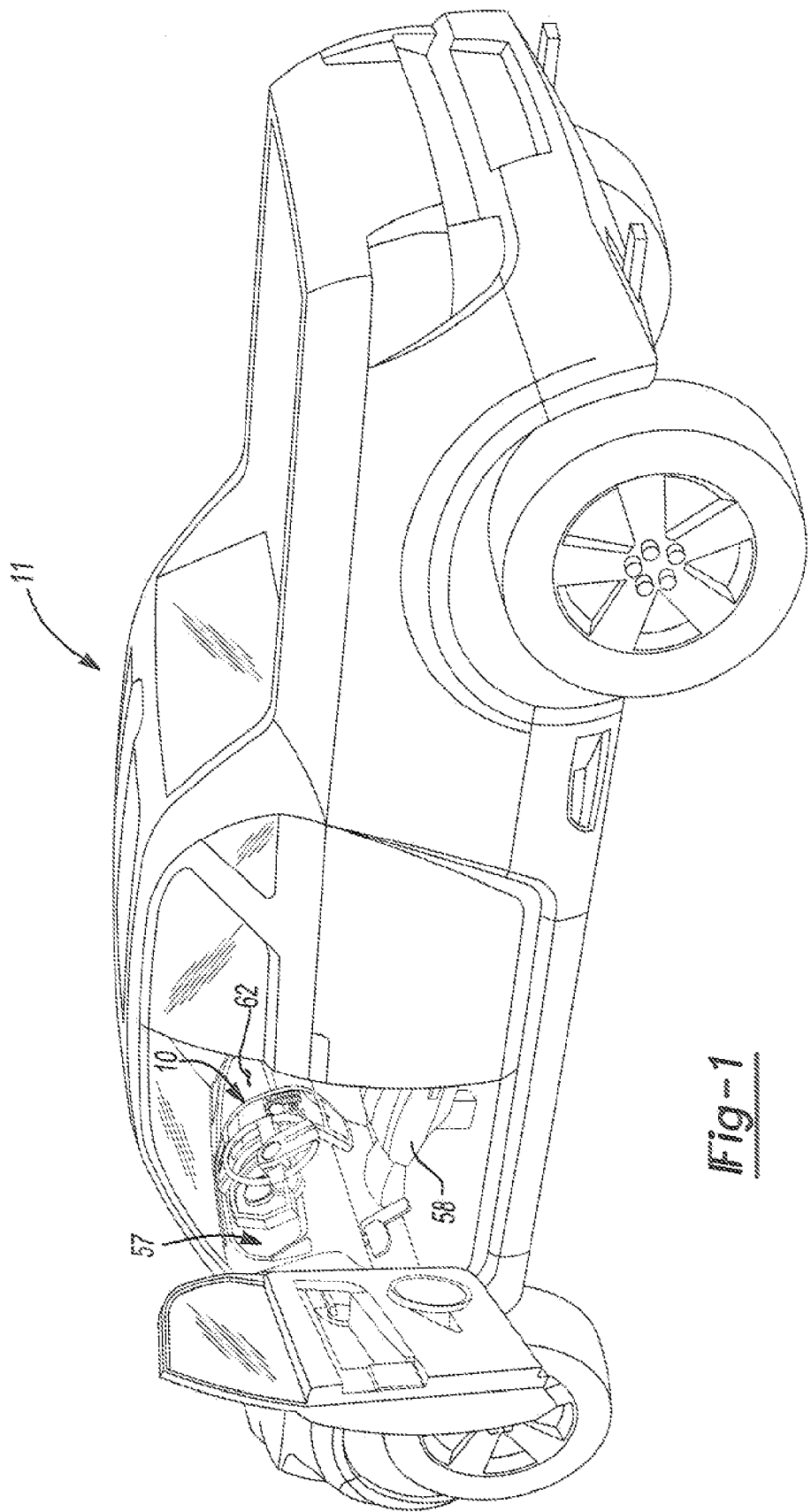
FIG. 1 is a perspective view of a vehicle incorporating a center console in accordance with the principles of the present invention.

The following description of the preferred embodiment(s) is merely exemplary in nature and is in no way intended to limit the invention, its application, or uses.

With reference to the figures, an articulating center console 10 for a vehicle 11 is provided. The articulating center console 10 is selectively movable relative to the vehicle and includes a housing 12, an actuation mechanism 14, and a locking mechanism 16. The actuation mechanism 14 cooperates with the housing 12 to permit the housing 12 to move relative to the vehicle 11 while the locking mechanism 16 cooperates with the housing 12 to selectively prevent movement of the housing 12 relative to the vehicle 11.

The housing 12 includes a main body 18, a display region 20, and a pair of mounting regions 22. The main body 18 supports the display region 20 generally between the pair of mounting regions 22 and may include a storage compartment 24. The storage compartment 24, along with the display region 20 and mounting regions 22, are selectively rotatable with the main body 18 relative to the vehicle 11.

The display region 20 may include various control devices for controlling the vehicle and/or subassemblies of the vehicle 11. For example, the display region 20 may include a display 26, an audio system 28, a heating, ventilation, and air conditioning system (HVAC system) 30 and a global positioning system (GPS) 32. The display region 20 may include controls for the respective systems 26, 28, 30, 32 such that the controls of the display 26, audio system 28, HVAC system 30, and GPS system 32 rotate with the housing 12 relative to the vehicle 11.

The actuation mechanism 14 cooperates with the mounting regions 22 of the housing 12 to permit the housing 12 to selectively pivot relative to the vehicle 11 as well as to selectively translate the housing 12 relative to the vehicle 11. The actuation mechanism 14 may include a top arm 34 that interacts with a mounting region 22 disposed proximate to a top portion of the housing 12 and a bottom arm 36 that interacts with the mounting region 22 disposed proximate to a lower portion of the housing 12. The top arm 34 may include a post 38 that is rotatably received within a collar 40 of the top mounting region 22. The bottom arm 36 may similarly include a post 42 that is rotatably received within a collar 44 of the lower mounting region 22.

The top arm 34 may include a rail system 46 having a first rail 48 attached to the vehicle 11 and a second rail 50 attached to the upper mounting region 22 of the housing 12. The second rail 50 is slidably attached to the first rail 48 such that the second rail 50 is selectively movable relative to the first rail 48.

The bottom arm 36 may similarly include a rail system 52 including a first rail 54 attached to the vehicle 11 and a second rail 56 attached to the bottom mounting region 22 of the housing 12. The second rail 56 is slidably attached to the first rail 54 such that the second rail 56 is selectively movable relative to the first rail 54.

Figure 2:
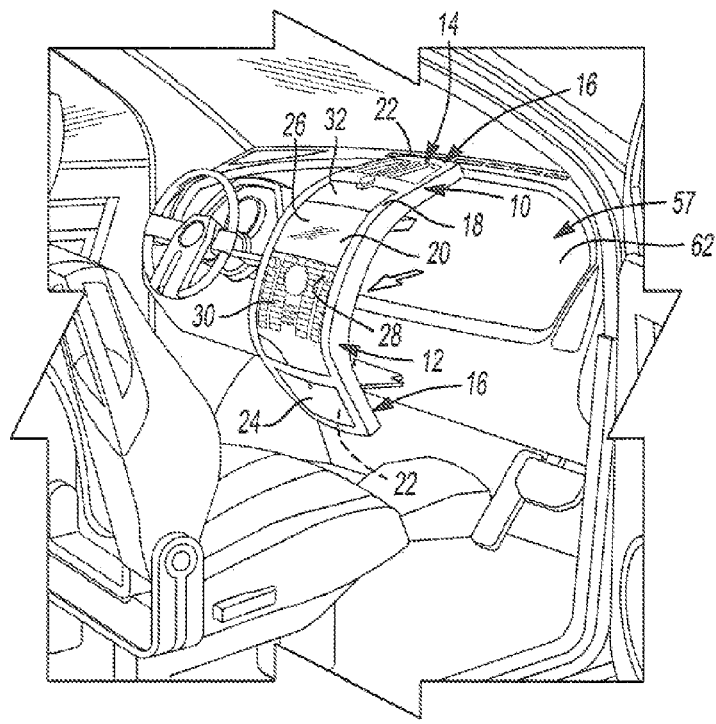
FIG. 2 is a perspective view of the center console of FIG. 1 in a translated position.
Figure 3:
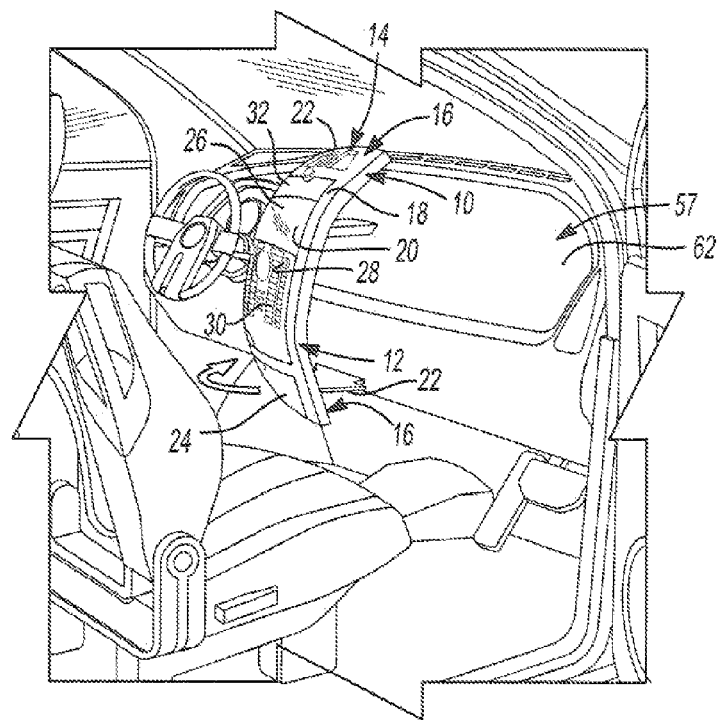
FIG. 3 is a perspective of the center console of FIG. 1 in a first rotated positions.
Figure 4:
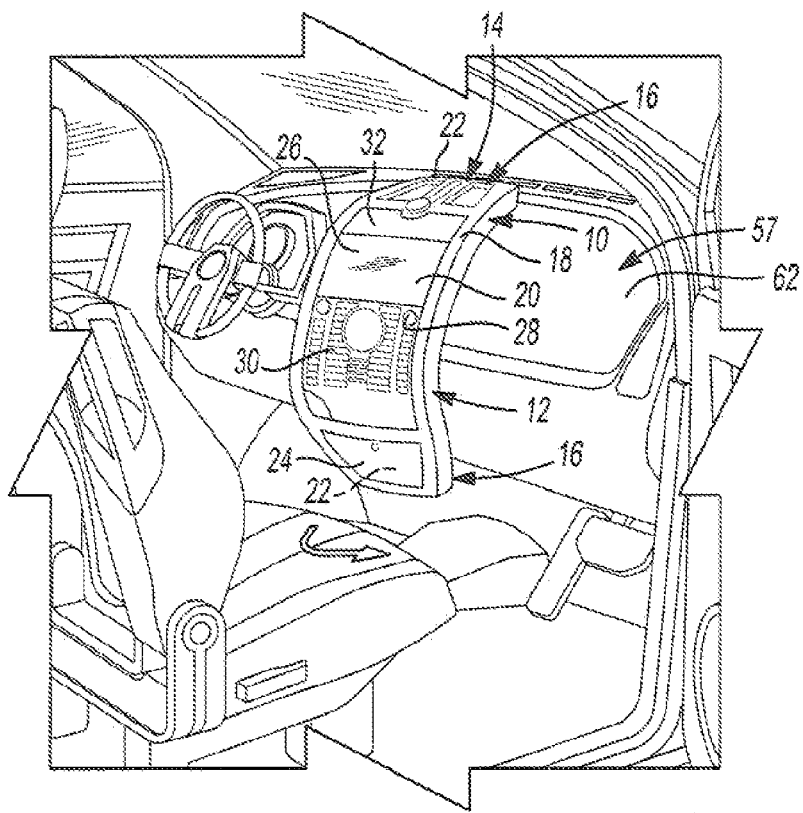
FIG. 4 is a perspective of the center console of FIG. 1 in a second rotated position.
Figure 5:
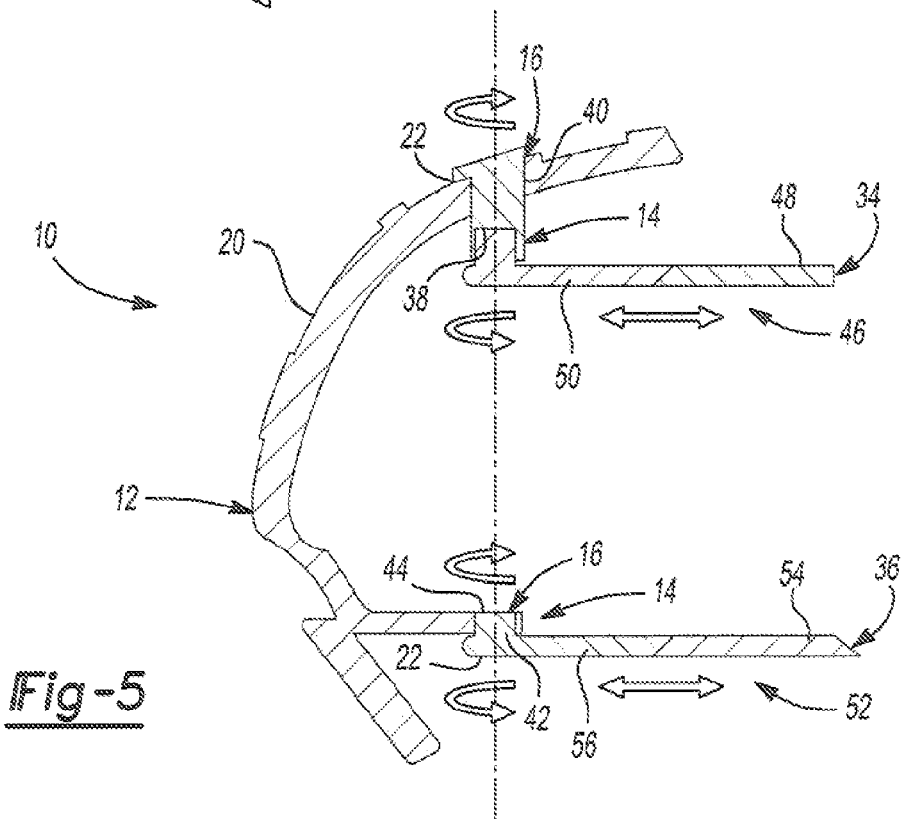
FIG. 5 is a cross-sectional view of the center console of FIG. 1 showing an axis of rotation of the center console.

Because the second rail 50 of the top arm 34 is slidably attached to the first rail 48 and the second rail 56 of the bottom arm 36 is slidably attached to the first rail 54, the housing 12 may be selectively translated toward and away from the first rails 48, 54 (FIG. 2). In addition, because the top arm 34 and bottom arm 36 are rotatably attached to the housing 12 via interaction between the posts 38, 42 and collars 40, 44, respectively, the housing 12 may also be rotated relative to the first rails 48, 54 independent from or during translation of the housing 12 relative to the first rails 48, 54.

The locking mechanism 16 may be associated with either mounting region 22 of the housing 12 and may interact with the actuation mechanism 14 to selectively prevent movement of the housing 12 relative to the vehicle 11. The locking mechanism 16 may interact with both posts 38, 42 and/or both collar 40, 44 to prevent rotation of the housing 12 relative to the vehicle 11. The locking mechanism 16 may also interact with one or both of the first rails 48, 54 and second rails 50, 56 to selectively present movement of one or both of the second rails 50, 56 relative to the first rails 48, 54. The locking mechanism 16 associated with the mounting regions 22 of the housing 12 and with the rail systems 46, 52 may include a friction-controlled stop that prevents pivotable and translational movement of the housing 12 relative to the vehicle 11.

Figure 6:
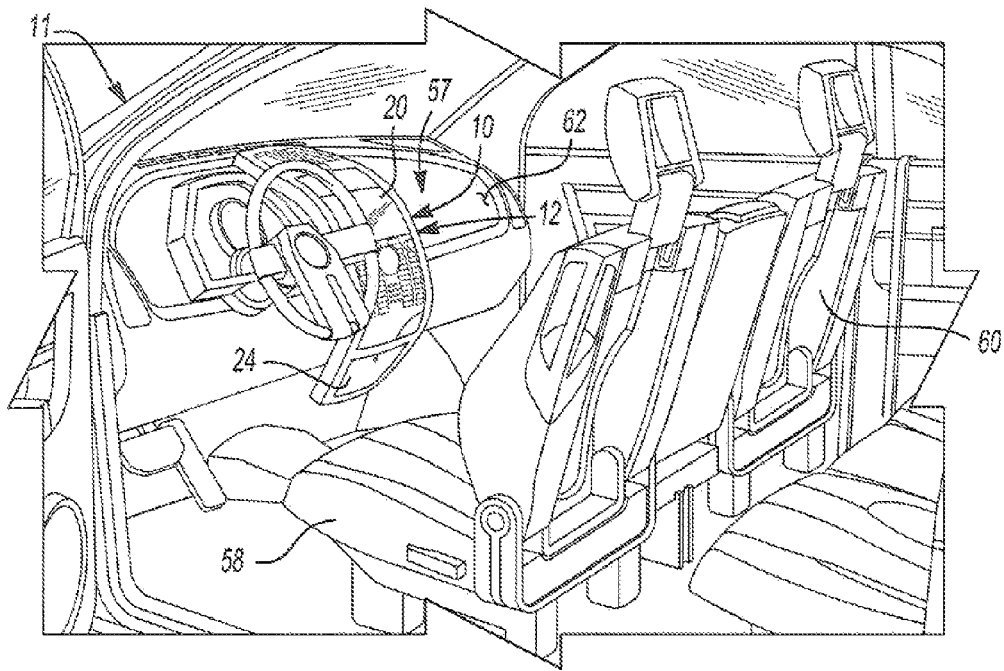
FIG. 6 is a perspective view of an interior of the vehicle of FIG. 1 with the center console in a design position.
Figure 7:
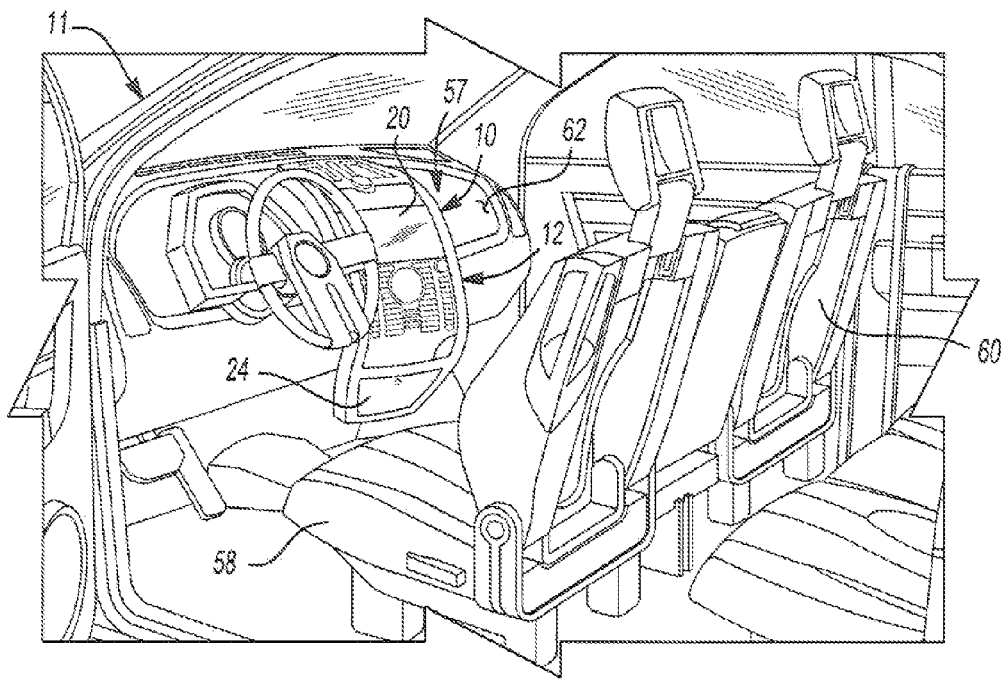
FIG. 7 is a perspective view of an interior of the vehicle of FIG. 1 with the center console in a first rotated position.
Figure 8:
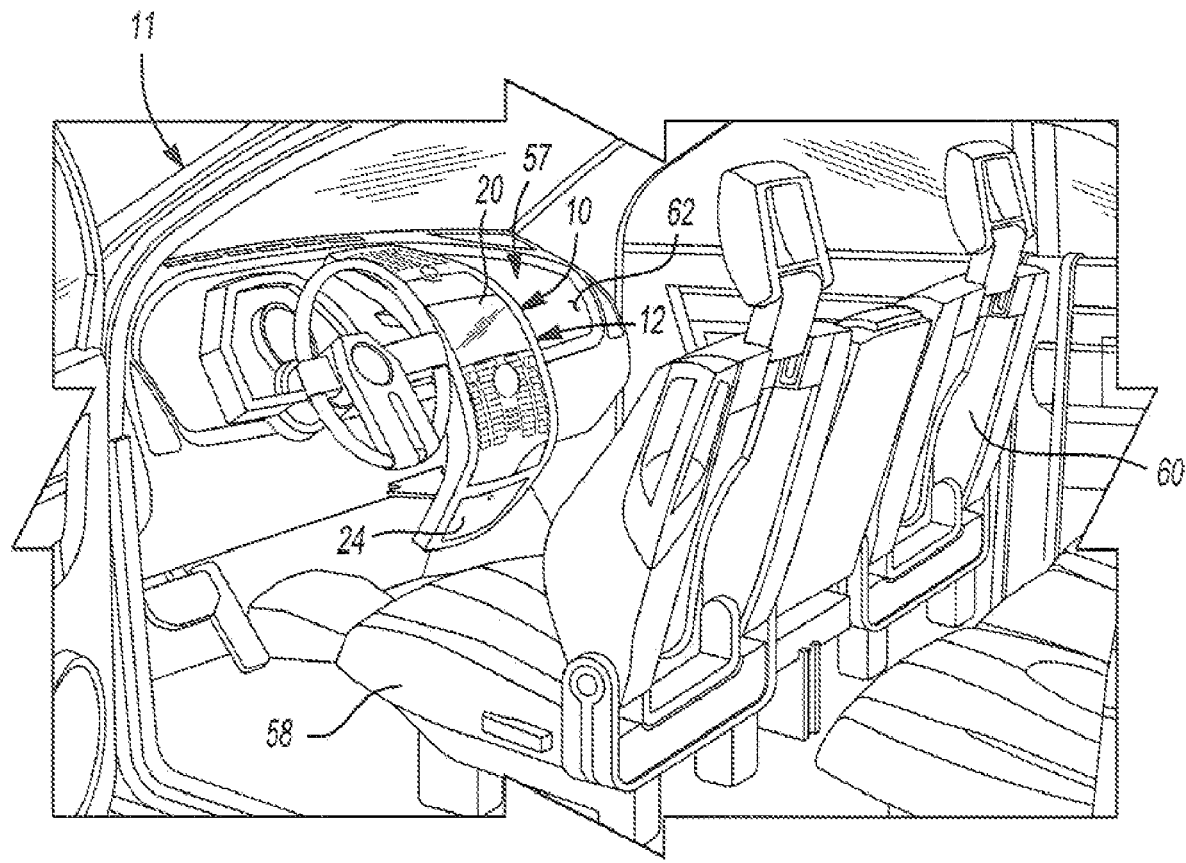
FIG. 8 is a perspective view of an interior of the vehicle of FIG. 1 with the center console in a translated position.

With particular reference to FIGS. 6-8, the articulating center console 10 is shown incorporated into an instrument panel 57. The housing 12 is shown in a design position in FIG. 6 with the controls of the various systems 26, 28, 30, 32 positioned generally between a driver seat 58 and a passenger seat 60. In this position, the controls of the respective systems 26, 28, 30, 32 are generally parallel to a front surface 62 of the instrument panel 57.

To facilitate use of the controls of the various systems 26, 28, 30, 32, a force may be applied to the housing 12 to pivot and/or translate the housing 12 and, thus, the controls of the systems 26, 28, 30, 32 relative to the instrument panel 57. For example, a force may be applied to the housing 12 to translate the housing 12 away from the front surface 62 of the instrument panel 57 such that the controls of the various systems 26, 28, 30, 32 are closer to occupants seated in the driver seat 58 and/or passenger seat 60. Once moved into a desired position relative to the instrument panel 57, the locking mechanism 16 may be engaged to prevent further movement of the housing 12 relative to the vehicle 11 until the locking mechanism 16 is moved from a locked state to an unlocked state.

The housing 12 may be pivoted relative to the instrument panel 57 before or after translation of the housing 12 relative to the instrument panel 57 such that the controls of the various 26, 28, 30 and 32 oppose one of the driver seat 58 and passenger seat 60.

For example, if the driver of the vehicle 11 is the sole occupant of the vehicle 11, the housing 12 may be pivoted relative to the instrument panel 57 such that the housing 12 is at an angle relative to the front surface 62 of the instrument panel 57. In this position, the controls of the various systems 26, 28, 30, 32 oppose the driver seat 58 to facilitate use of the controls by the driver. In addition to pivoting the housing 12 relative to the instrument panel 57 such that the controls of the various systems 26, 28, 30, 32 oppose the seat 58, the housing 12 may be translated toward or away from the front surface 62 of the instrument panel 57 to accommodate the particular occupant.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A center console for an instrument panel, the center console comprising:
   a housing having a display region;
   an actuation mechanism associated with said housing and operable to selectively translate said housing away from the instrument panel and to rotate said display region about a vertical axis between a first use position and a second use position; and
   a locking mechanism operable to selectively prevent translation and rotation of said housing relative to said instrument panel.

2. The center console of claim 1, wherein said housing includes a storage compartment rotatable with said housing relative to the instrument panel.

3. The center console of claim 1, wherein said actuation mechanism includes at least one rail that facilitates translation of said housing relative to the instrument panel.

4. The center console of claim 3, wherein said at least one rail includes a pivot that permits rotation of said housing relative to said at least one rail and the instrument panel.

5. The center console of claim 1, wherein the said display region includes at least one control device.

6. The center console of claim 5, wherein said at least one control device includes controls for at least one of a heating, ventilation, and air conditioning system, an audio system, and a global positioning system.

7. The center console of claim 1, further comprising a wire harness extending from the instrument panel to said housing to supply said housing with at least one of power and data.

8. The center console of claim 1, wherein said actuation mechanism includes a pivot that permits rotation of said housing relative to the instrument panel.

9. An instrument panel for a vehicle having a driver seat and a passenger seat, the instrument panel comprising:
   a center console having a display that is selectively translatable towards and away from the instrument panel and rotatable about a vertical axis between a first use position adjacent to the driver seat and a second use position adjacent to the passenger seat; and
   a locking mechanism that selectively prevents movement of said display relative to the instrument panel.

10. The instrument panel of claim 9, wherein said center console includes at least one storage space selectively movable with said center console relative to the instrument panel.

11. The instrument panel of claim 9, further comprising a wire harness extending from the instrument panel to said center console to supply said center console with at least one of power and data.

12. A vehicle comprising:
   an instrument panel; and
   a passenger seat;
   an instrument panel opposing said driver seat and said passenger seat;
   a center console having a display, said center console being translatable towards said driver seat and said passenger seat and away from said instrument panel and rotatable about a vertical axis between a first use position adjacent to said driver seat and a second use position adjacent to said passenger seat; and
   a locking mechanism operable to selectively prevent movement of said center console relative to said instrument panel.

13. The vehicle of claim 12, further comprising at least one rail that facilitates translation of said center console between said first use position and said second use position.

14. The vehicle of claim 12, wherein said at least one rail includes a pivot that permits rotation of said center console relative to said at least one rail and said instrument panel.

15. The vehicle of claim 12, further comprising a wire harness extending from said instrument panel to said center console to supply said center console with at least one of power and data.

16. The vehicle of claim 12, wherein said center console includes at least one storage space selectively movable with said center console relative to said instrument panel.

* * * * *